3,439,086
REFERENCE DEVICES FOR TOOLS OF CUTTING, STAMPING AND SWAGING PRESSES
Gaëtan de Coye de Castelet, Billancourt, France, assignor to Regie Nationale des Usines Renault, Billancourt, France
Filed June 27, 1966, Ser. No. 560,450
Claims priority, application France, July 6, 1965, 23,682
Int. Cl. B29c *1/02*
U.S. Cl. 264—219                                                6 Claims

ABSTRACT OF THE DISCLOSURE

A reference device comprising a profiled plate corresponding to a model and a frame having the plate mounted thereon. The plate is preferably formed of a mixture of polyepoxid and glass fibers. The frame is preferably made from expanded polystyrene. The plate and frame are integrally bonded together with a layer of epoxid resin and glass fibers.

---

Reference devices are already known which are intended for controlling during their manufacture, checking or properly positioning, press tools for stamping, cutting or swaging sheet parts, notably in the automotive coachwork industry. It is also known that these devices comprise as a rule a shape plate or skin of which one face is the actual reference shape, the other face being secured to a frame supporting said plate or skin and permitting properly positioning same in the space by means of fastening blocks sealed to said frame.

The shape plate or skin, hereinafter referred to as the "skin," consists as a rule of several layers of resin-impregnated glass fiber fabric, and the frame consists on the other hand either of flat plates of a material comprised preferably of two glass fabric sheets, coated with a suitable plastic material such as polyepoxide resin, between which is interposed a sheet of cellular material, this last-named assembly being usually referred to as "sandwich material," or of tubular columns of stratified plastic-impregnated glass fabric which are usually braced to one another, these flat plates or columns being sealed to one another and to said "skin" by means of a resin such as a polyepoxide resin.

However, either of these two manufacturing methods is attended by serious drawbacks. Since the above-defined "sandwich" material is costly, fragile, difficult to fit and cannot be tapped under normal working conditions, it is clear that references devices manufactured according to the first method are extremely costly, and that it is definitely precluded to fit screws into their walls for fastening auxiliary equipment thereto such as plaster blocks denoting the so-called "sheet-clamp" lines along which the press tools can clamp the sheet blank to be swaged or stamped. The second method is extremely long to carry out for, as a matter of fact, all the columns and tubular bracing members must be cut to length and only one end of these elements can be sealed at a time to avoid creating detrimental internal stress in the frame structure.

It is the essential object of the present invention to avoid the drawbacks set forth hereinabove.

The chief object of the present invention consists in providing a method of manufacturing a reference device for press tools; this device constituting a reference model comprises a shape plate or skin of which one of the faces reproduces the reference shape of the sheet part to be manufactured, and a frame supporting said plate or skin and capable of properly positioning same by means of fastening and positioning blocks mounted thereon; this method consisting in preparing to the skin dimensions a frame, either solid or made of braced elements, preferably of expanded polystyrene or any other suitably lightweight material easy to implement, said frame substantially corresponding in shape to said reference shape, in laying said frame upon a skin obtained preferably by gun-spraying a mixture of resin and cut glass fibers, subsequently coating, also by gun-spraying, said frame with a layer of the same material in order to cause it to adhere to said skin, fixing thereto easily-tapped fastening and positioning lugs, embedding said lugs in another layer of said coating material, and finally setting said coating material.

In order to afford a clearer understanding of this invention and of the manner in which the same may be carried out in practice, reference will now be made to the attached drawing illustrating diagrammatically by way of example a typical form of embodiment of the reference device constituting the subject-matter of this invention. In the drawing.

Figure 1:
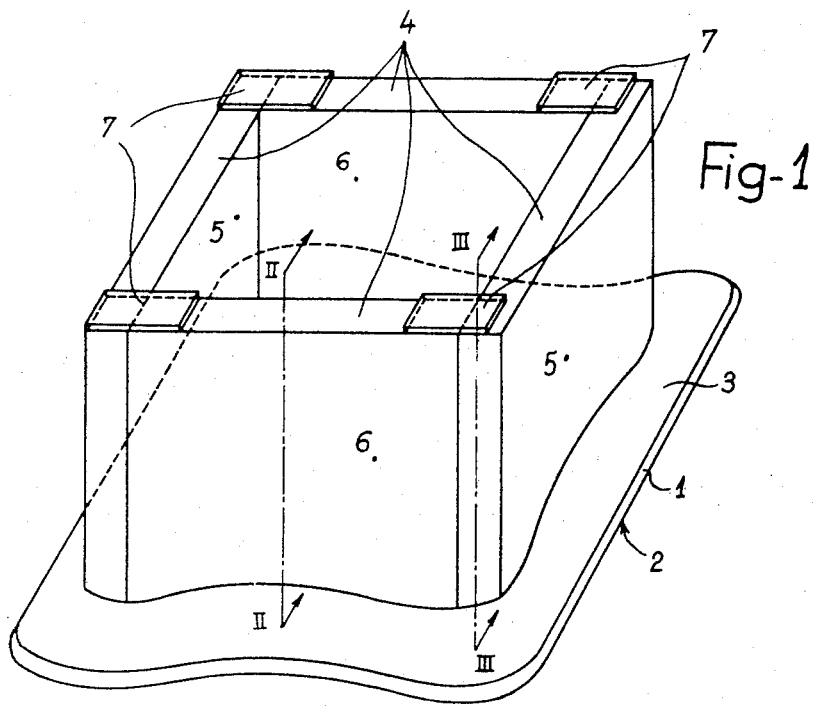
FIGURE 1 is a perspective view of the device in its assembled condition but before coating or embedding its frame.

Referring to FIGURE 1 of the drawing, it will be seen that the reference model according to this invention comprises a shape plate or skin 1 of resin-impregnated glass fiber, of which the lower face 2 reproduces the reference shape.

Laid upon the top face 3 of the shaped plate 1 is a frame 4 consisting of walls 5 and 6 of so-called expanded polystyrene, which are assembled preferably by gluing to each other and provided at their upper portion with small plates 7 of a material adapted to be tapped, such as a fabric impregnated with phenol resin.

Figure 2:
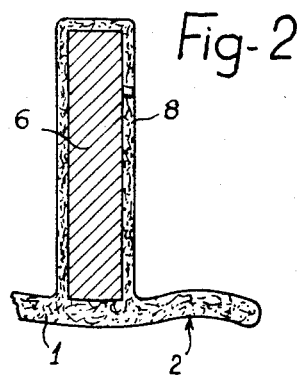
FIGURE 2 is a section taken upon the line II—II of FIGURE 1.
Figure 3:
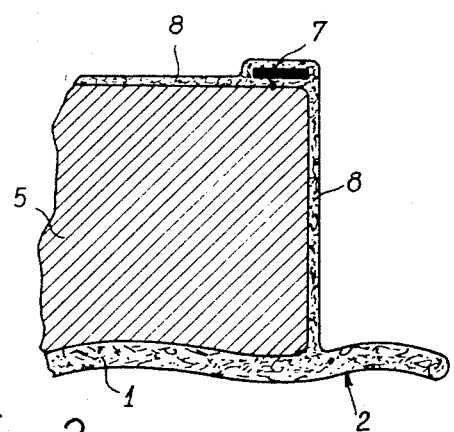
FIGURE 3 is another section taken upon the line III—III of FIGURE 1.

A layer of coating material 8, for instance a mixture of resin and glass fibers, covers the plates 7 and walls 5, 6 of the frame, thus assembling the frame to the shaped plate 1 (see FIGURES 2 and 3).

In the above-described method of manufacturing the above-described assembly, according to this invention, the walls 5 and 6 of the frame 4 of expanded polystyrene are firstly cut and fitted on the workshop surface-plate and subsequently assembled by using a suitable adhesive; if necessary, this frame is subsequently braced, its contour corresponding at least roughly to that of the reference plate, its height being selected to impart a good mechanical inertia to the assembly, that is, in the range of 250 to 500 mm.

On the other hand, the skin 1 is provided as follows:

After having coated the model plate (not shown) of the part to be manufactured with a stripping agent and after having coated this plate with a surface layer, a first layer of material 8 such as a mixture of so-called "roving" cut glass fibers and resin of the polyepoxide or epoxy type is sprayed by using a conventional spray gun. Then the frame is lowered upon the frame of this skin and the gun-spraying is continued to coat the chest back with a layer about 6 mm. thick, thus bonding same to the skin 1.

Eventually, the small plates 7 are fitted and subsequently embedded still by using the spray-gun at the points contemplated for the fastening and positioning blocks.

The assembly is then allowed to set by causing the coating resin to polymerize.

It is clear that with the method of this invention it is possible to save considerable time over the conventional methods, the polymerization operation taking place in one time, the expanded plastic plates being easy to cut or shear to any desired configuration.

Finally, in addition to the fastening and positioning blocks, the reference device may be provided with auxiliary equipment by simply securing same to the walls 8 hardened by polymerization.

Of course, the specific form of embodiment described hereinabove with reference to the attached drawing should not be construed as limiting the invention since many modifications may be brought thereto without departing from the spirit and scope of the invention as set forth in the appended claims.

I claim:

1. A method for producing a reference device for press tools of the type used for manufacturing parts corresponding to a model plate, said reference device comprising a shaped plate one surface of which reproduces the reference shape and a frame including fastening and adjusting means fixedly mounted on the opposite surface of said plate, comprising the steps of forming a frame of substantially rigid plastic material, contouring one portion of said frame to receive said plate, forming said plate by gun-spraying a mixture of resin and glass fibers on a model, mounting said plate on said frame and bonding said plate and said frame together by further gun-spraying of said mixture, mounting easily-tapped fastening and adjusting blocks on said frame and bonding thereto by a further layer of said material, and allowing said material to set throughout.

2. A method according to claim 1, wherein said frame is formed from expanded polystyrene.

3. A method according to claim 1, wherein the material applied by gun-spraying consists of a mixture of polyepoxid and glass fibers.

4. A method according to claim 2, wherein said fastening and adjustment blocks consist of fabric impregnated with phenol resin.

5. A method according to claim 2, wherein said frame is lined with the glass-resin mixture and subsequently bonded to the plate.

6. A method according to claim 4, wherein said frame is lined with said glass-resin mixture and bonded to the plate by using a mixture of epoxid resin and glass fibers applied by gun-spraying.

References Cited

UNITED STATES PATENTS

| 2,845,379 | 8/1958 | Bey | 264—220 |
| 3,108,853 | 10/1963 | Short et al. | 264—219 |
| 3,242,247 | 3/1966 | Watson | 264—219 |
| 3,243,485 | 3/1966 | Griffin | 264—321 |

JULIUS FROME, Primary Examiner.

T. MORRIS, Assistant Examiner.

U.S. Cl. X.R.

18—36; 264—220, 263